Patented Mar. 15, 1949

2,464,398

UNITED STATES PATENT OFFICE 2,464,398

MANUFACTURING TETRAETHYL LEAD

Willis Jackson Clem, Wilmington, Del., and Roy Joseph Plunkett, Woodstown, N. J., assignors to E. I. du Pont de Nemours & Company, Wilmington, Del., a corporation of Delaware No Drawing. Application March 12, 1946, Serial No. 653,952

17 Claims. (Cl. 260—437)

This invention relates to a process for manufacturing tetraethyl lead and more particularly to catalyzing the ethylation of lead monosodium alloy with ethyl chloride.

In the usual commercial process for manufacturing tetraethyl lead, ethyl chloride is reacted with lead monosodium alloy in a closed vessel under pressure at about 65° C. to about 85° C. This process ordinarily requires 5 or more hours to complete the reaction. In recent years, it has become important to very greatly increase the production of tetraethyl lead. In order to increase such production materially, it has become important and desirable to greatly decrease the time for carrying the reaction to completion. When it has been attempted to decrease the time of reaction in the old processes, the yield of tetraethyl lead from a given batch of alloy is materially decreased and additional and difficult problems of separating the tetraethyl lead from the reaction mass have been encountered.

An object of the present invention is to provide a process whereby the speed of the reaction is materially increased without a substantial decrease in the yield. Another object is to provide a process whereby the time for completion of the reaction may be greatly decreased with a resulting large increase in the production of tetraethyl lead. A further object is to provide new and improved catalysts for the reaction of ethyl chloride with lead monosodium alloy. Other objects are to advance the art. Still other objects will appear hereinafter.

The above and other objects may be accomplished in accordance with our invention which comprises carrying out the reaction of ethyl chloride on lead monosodium alloy, in the presence of a small proportion, sufficient to accelerate the reaction, of an ester of carboxylic acid, which ester contains from 1 to 3 ester groups and consists of carbon, hydrogen, oxygen and 0 to 2 halogen atoms, the oxygen being ester, alcoholic and ethereal oxygen solely. We have found that such esters are extremely effective catalysts for this reaction increasing the speed of the reaction to such an extent that the time required for completion of the reaction is reduced to about one hour. At the same time, high yields of tetraethyl lead are obtained and the difficulty of separating the tetraethyl lead from the reaction mass is not increased. Thereby, the production of tetraethyl lead in a plant is very materially speeded and increased.

We have found that the members of the above defined class of esters are, as a whole, very effective for accelerating the reaction. The carboxylic acid may be aromatic, alicyclic or acyclic. Similarly, the esterifying group may be aromatic, alicyclic or acyclic. Preferably, the esterifying group is aliphatic. While ethyl benzoate appears to be one of the most effective compounds for this purpose, we have found that, in general, the aliphatic esters of the aliphatic carboxylic acids are the most effective compounds, and particularly those containing from 2 to 12 carbon atoms and a single ester group.

The term "aliphatic" as employed herein is employed in the strict sense to mean an open chain group and to exclude aromatic and like substituents. The aliphatic groups may be saturated or unsaturated and may contain halogen, hydroxy and ether groups as substituents. The term "a carboxylic acid" will include carbonic acid and chlorocarbonic acid, which is also known as chloroformic acid. The term "ester oxygen" will be understood to mean the oxygen atoms which form the ester group. The term "alcoholic oxygen" will be understood to mean the oxygen of an alcoholic hydroxyl group. The term "ethereal oxygen" will be understood to mean the oxygen of an ether group. Preferably, the oxygen in the esters will be ester oxygen solely.

Compounds which have been found to be effective to accelerate this reaction are as follows:

Ethyl benzoate
Ethyl n-butyrate
Ethyl n-caproate
Ethyl i-valerate
Ethyl i-butyrate
Ethyl n-valerate
Ethyl β-hydroxy n-butyrate
Ethyl n-caprylate
Ethyl malonate
Ethyl α-bromo n-butyrate
Ethyl citrate
Ethyl β-chloropropionate
Ethyl acetate
Ethyl phthalate
Ethyl α-hydroxy i-butyrate Ethyl chlorocarbonate
Ethyl maleate
Ethyl oleate
Ethyl laurate
Ethyl butyl carbonate
Ethyl isopropyl carbonate
Methyl stearate
Methyl o-iodobenzoate
Methyl α-bromocaprylate
Methyl caprylate
Methyl carbonate
n-Amyl chlorocarbonate
i-Amyl n-caproate
Allyl propionate
Benzyl n-butyrate
Butyl sebacate
Butyl carbonate
p-Cresyl benzoate
Cetyl acetate
Capryl adipate
γ-Chloropropyl chlorocarbonate
Di-p-cresyl carbonate
Diethyl carbonate
Dichloroethyl acetate
Diethyl oxalate
Guaiacol n-caproate The amount of the ester employed may be varied widely and will depend upon the conditions employed and particularly on the size of the batches and the equipment. Generally, they will be employed in the proportion of from about 0.1% to about 1% based on the ethyl chloride. If the proportions of ester employed is substantially above 1% in large scale plant operations carried out in an autoclave, they become less effective and may even be detrimental to the yields. Generally, in small scale production in a bomb, larger amounts of the esters will be effective and may even be desirable. In small scale experiments, some of the esters have been found to be effective in proportions as high as 1.5% based on the ethyl chloride. However, in substantially all cases, the optimum results are obtained with less than 1% of the ester.

While the ester may be added to the reactants or to the reaction vessel in any desired manner and at any desired stage of the process, it will generally be most desirable to add the ester to the ethyl chloride prior to mixing the ethyl chloride with the alloy. The process of making tetraethyl lead will remain unchanged, except for the addition of the ester and the shorter time required for the completion of the process.

In order to more clearly illustrate our invention, preferred modes of carrying the same into effect and the advantageous results to be obtained thereby, the following examples are given:

Example I

Approximately 100 g. of lead-sodium alloy (containing 10.0% sodium) of a size which passed a 4 mesh screen and was retained on a 10 mesh screen, was charged into each of six steel bombs having a capacity of 150 ml. Fifty milliliters of ethyl chloride was added to each bomb and 0.4 cc. of diethyl carbonate was added to each of three of them. The bombs were closed and tumbled in a water-bath maintained at 85° C. for 90 minutes. After the heating period, the hot water was drained and the bath was refilled with cold water. After 15 minutes, the bombs were removed and placed on ice.

Each reaction mass was extracted with 2000 ml. of benzene. A 50 ml. aliquot of the benzene solution was titrated with iodine solution to determine the yield of tetraethyl lead. The yields, in the three bombs containing diethyl carbonate, were 90.21%, 92.78% and 92.31% while the yields in the other three were 71.59%, 55.53% and 66.22%.

Example II

A run was made similar to Example I except that 0.3 cc. of ethyl chlorocarbonate (ethyl chloroformate) was substituted for the diethyl carbonate and the heating time at 85° C. was approximately two hours. The yields, in the three containing ethyl chlorocarbonate, were 88.03%, 88.50% and 88.32% while the yields in the other three were 83.00%, 45.23% and 83.67%.

It will be understood that our invention is not to be limited to the specific embodiments disclosed, but that our invention may be modified in various respects without departing from the spirit or scope thereof. For example, other esters of carboxylic acids within the class hereinbefore defined may be substituted for those specifically disclosed herein.

We claim:

1. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an ester of a carboxylic acid of the group consisting of esters containing from 1 to 3 ester groups and consisting of carbon, hydrogen and oxygen and corresponding monohalogen and di-halogen substituted esters, the oxygen being acyclic ester, alcoholic and acyclic ethereal oxygen solely.

2. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an ester of a carboxylic acid, which ester contains a single ester group and consists of carbon, hydrogen, and oxygen, the oxygen being acyclic ester, alcoholic and acyclic ethereal oxygen solely.

3. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 1 to 3 ester groups and consists of carbon, hydrogen and oxygen, the oxygen being acyclic ester, alcoholic and acyclic ethereal oxygen solely.

4. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains a single ester group and consists of carbon, hydrogen and oxygen, the oxygen being acyclic ester, alcoholic and acyclic ethereal oxygen solely.

5. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 2 to 12 carbon atoms and a single ester group and consists of carbon, hydrogen and oxygen, the oxygen being acyclic ester, alcoholic and acyclic ethereal oxygen solely.

6. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 1 to 2 ester groups and consists of carbon, hydrogen and oxygen, the oxygen being acyclic ester, alcoholic and acyclic ethereal oxygen solely.

7. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 2 to 12 carbon atoms and a single ester group and consists of carbon, hydrogen and acyclic ester oxygen.

8. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of diethyl carbonate.

9. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of ethyl chlorocarbonate.

10. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of ethyl benzoate.

11. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an ester of a carboxylic acid, which ester contains from 1 to 3 ester groups and consists of carbon, hydrogen and oxygen, the oxygen being acyclic ester, alcoholic and acyclic ethereal oxygen solely.

12. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an ester of a carboxylic acid, which ester contains a single ester group and consists of carbon, hydrogen, oxygen and 1 to 2 halogen atoms, the oxygen being acyclic ester, alcoholic and acyclic ethereal oxygen solely.

13. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 1 to 3 ester groups and consists of carbon, hydrogen, oxygen and 1 to 2 halogen atoms, the oxygen being acyclic ester, alcoholic and acyclic ethereal oxygen solely.

14. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains a single ester group and consists of carbon, hydrogen, oxygen and a single halogen atom, the oxygen being acyclic ester, alcoholic and acyclic ethereal oxygen solely.

15. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 2 to 12 carbon atoms and a single ester group and consists of carbon, hydrogen, oxygen and 1 to 2 halogen atoms, the oxygen being acyclic ester, alcoholic and acyclic ethereal oxygen solely.

16. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 1 to 2 ester groups and consists of carbon, hydrogen, oxygen and 1 to 2 chlorine atoms, the oxygen being acyclic ester, alcoholic and acyclic ethereal oxygen solely.

17. In the process of making tetraethyl lead by the reaction of ethyl chloride on lead monosodium alloy in a closed vessel under pressure at from about 65° C. to about 85° C., the improvement which comprises carrying out the reaction in the presence of from about 0.1% to about 1% by weight based on the ethyl chloride, sufficient to accelerate the reaction, of an aliphatic ester of an aliphatic carboxylic acid, which ester contains from 2 to 12 carbon atoms and a single ester group and consists of carbon, hydrogen, acyclic ester oxygen and a single chlorine atom.

WILLIS JACKSON CLEM.
    ROY JOSEPH PLUNKETT.

REFERENCES CITED

The following references are of record in the file of this patent:

UNITED STATES PATENTS

| Number | Name | Date |
|---|---|---|
| 1,559,405 | Calcott et al. | Oct. 27, 1925 |
| 1,645,389 | Monroe (I) | Oct. 27, 1927 |
| 1,645,390 | Monroe (II) | Oct. 27, 1927 |
| 1,661,809 | Monroe (III) | Mar. 6, 1928 |
| 1,658,544 | Yauntz | Feb. 7, 1928 |
| 1,717,961 | Daudt et al. | June 18, 1929 |
| 1,749,567 | Daudt | Nov. 4, 1930 |
| 2,000,069 | Downing et al. | May 7, 1935 |

FOREIGN PATENTS

| Number | Country | Date |
|---|---|---|
| 453,271 | Great Britain | Sept. 1936 |
| 504,827 | Germany | Aug. 14, 1930 |

OTHER REFERENCES

Hale, "Synthetic Use of Metals" (1914), page 120.

Certificate of Correction

Patent No. 2,464,398. March 15, 1949.

WILLIS JACKSON CLEM ET AL.

It is hereby certified that error appears in the printed specification of the above numbered patent requiring correction as follows:

Column 8, line 2, list of references cited, for "Yauntz" read *Youtz*;

and that the said Letters Patent should be read with this correction therein that the same may conform to the record of the case in the Patent Office.

Signed and sealed this 30th day of August, A. D. 1949.

[SEAL]

THOMAS F. MURPHY,
*Assistant Commissioner of Patents.*